(12) United States Patent
Sakoda et al.

(10) Patent No.: US 12,137,705 B2
(45) Date of Patent: Nov. 12, 2024

(54) PET FOOD

(71) Applicant: Unicharm Corporation, Ehime (JP)

(72) Inventors: Junya Sakoda, Itami (JP); Fumisato Yoshiga, Itami (JP)

(73) Assignee: UNICHARM CORPORATION, Ehime (JP)

( * ) Notice: Subject to any disclaimer, the term of this patent is extended or adjusted under 35 U.S.C. 154(b) by 406 days.

(21) Appl. No.: 17/610,807

(22) PCT Filed: Jan. 27, 2020

(86) PCT No.: PCT/JP2020/002741
§ 371 (c)(1),
(2) Date: Nov. 12, 2021

(87) PCT Pub. No.: WO2020/235139
PCT Pub. Date: Nov. 26, 2020

(65) Prior Publication Data
US 2022/0202043 A1    Jun. 30, 2022

(30) Foreign Application Priority Data
May 17, 2019  (JP) ................................ 2019-093764

(51) Int. Cl.
*A23K 10/12*  (2016.01)
*A23K 10/30*  (2016.01)
(Continued)

(52) U.S. Cl.
CPC .............. *A23K 10/12* (2016.05); *A23K 10/30* (2016.05); *A23K 20/147* (2016.05); *A23K 50/42* (2016.05)

(58) Field of Classification Search
CPC ....... A23K 10/12; A23K 10/30; A23K 20/147; A23K 50/42; A23K 50/40; A23V 2200/32;
(Continued)

(56) References Cited

U.S. PATENT DOCUMENTS 3,736,147 A * 5/1973 Jacobucci et al. ......... A23J 1/14
                                                             435/68.1
4,410,554 A * 10/1983 Sailer ......................... A23J 1/14
                                                             426/302
(Continued)

FOREIGN PATENT DOCUMENTS

CN    102178028 A    9/2011
CN    108464393 A    8/2018
(Continued)

OTHER PUBLICATIONS

Soy, Myth or Fact https://www.oakhurstveterinaryhospitalca.com/assets/pdfs/Purina%20Myths/Purina%20Mythbusters%20Soy.pdf (Year: 1997).*

(Continued)

*Primary Examiner* — Drew E Becker
*Assistant Examiner* — Luis Eugenio Diou Berdecia
(74) *Attorney, Agent, or Firm* — Fredrikson & Byron, P.A.

(57) ABSTRACT

A pet food that comprises a soybean protein isolate, a fermented soybean meal or a mixture thereof wherein a content of β-conglycinin is 5 mass % to 10 mass % in terms of dry matter, a content of a plant-based protein other than a plant-based protein derived from the soybean protein isolate and the fermented soybean meal is 11.0 mass % or less in terms of dry matter, and digestibility of a protein contained in the pet food is 88% or more.

4 Claims, 1 Drawing Sheet

(51) Int. Cl.
*A23K 20/147* (2016.01)
*A23K 50/42* (2016.01)

(58) Field of Classification Search
CPC .......... A23V 2250/54; A23V 2250/542; A23V 2250/548; A23V 2250/5488; A23J 1/14; A23J 1/148; A23J 3/16; A23L 11/05; A23L 11/07; A23L 11/50
USPC .......................................... 426/2, 53, 54, 630
See application file for complete search history.

(56) References Cited

U.S. PATENT DOCUMENTS

| | | | | | |
|---|---|---|---|---|---|
| 5,565,225 | A | * | 10/1996 | Johnston | A23K 20/147 426/19 |
| 6,171,640 | B1 | * | 1/2001 | Bringe | A23L 2/66 426/598 |
| 6,379,725 | B1 | * | 4/2002 | Wang | A23K 40/20 426/805 |
| 2006/0154855 | A1 | * | 7/2006 | Adams | A61K 36/48 514/17.7 |
| 2007/0224335 | A1 | * | 9/2007 | Wu | A23C 11/103 426/656 |
| 2008/0206400 | A1 | * | 8/2008 | Yokoyama | A21D 2/268 426/27 |
| 2008/0260894 | A1 | * | 10/2008 | Lim | A23K 50/30 426/2 |
| 2008/0305212 | A1 | * | 12/2008 | Wong | A23L 33/19 426/590 |
| 2009/0136588 | A1 | * | 5/2009 | Yamka | A61K 45/06 424/600 |
| 2010/0069289 | A1 | * | 3/2010 | Elvebo | A23K 20/163 514/18.7 |
| 2011/0064845 | A1 | * | 3/2011 | Summer | A23K 20/105 426/2 |
| 2011/0136745 | A1 | * | 6/2011 | Bringe | A61P 1/00 426/594 |
| 2011/0165305 | A1 | * | 7/2011 | Lynglev | A23L 33/18 435/68.1 |
| 2011/0257087 | A1 | * | 10/2011 | Krul | A23C 9/1526 435/375 |
| 2013/0122180 | A1 | * | 5/2013 | Brooks | A23D 7/003 426/609 |
| 2013/0331315 | A1 | * | 12/2013 | Krul | C07K 14/415 530/370 |
| 2014/0030380 | A1 | * | 1/2014 | Kitajima | A23L 27/88 426/656 |
| 2014/0148578 | A1 | * | 5/2014 | Kerr | A23L 2/66 530/378 |
| 2014/0274886 | A1 | * | 9/2014 | Weakley | A23K 20/147 426/2 |
| 2015/0044356 | A1 | * | 2/2015 | Bootsma | C12P 7/6434 426/531 |
| 2015/0080296 | A1 | * | 3/2015 | Silver | C07K 2/00 514/5.5 |
| 2015/0093474 | A1 | * | 4/2015 | Summer | A23K 10/38 426/69 |
| 2015/0342221 | A1 | * | 12/2015 | Lalgudi | A23K 40/00 426/656 |
| 2016/0249638 | A1 | * | 9/2016 | Gibbons | A23J 1/125 426/53 |
| 2017/0020161 | A1 | * | 1/2017 | Kim | C12N 1/205 |
| 2017/0238590 | A1 | * | 8/2017 | Bansal-Mutalik | A23J 1/148 |
| 2017/0258112 | A1 | * | 9/2017 | Ikezaki | A23K 20/142 |
| 2018/0125926 | A1 | * | 5/2018 | Williams | A23L 33/18 |
| 2018/0168197 | A1 | * | 6/2018 | Middleton | A23K 10/20 |
| 2018/0213822 | A1 | * | 8/2018 | Yamamoto | A23K 50/42 |
| 2018/0360075 | A1 | * | 12/2018 | Doerr | A23K 10/26 |
| 2018/0368453 | A1 | * | 12/2018 | Brown | A23L 13/424 |
| 2020/0054041 | A1 | * | 2/2020 | Ellegård | B01D 61/145 |

FOREIGN PATENT DOCUMENTS

| | | | |
|---|---|---|---|
| CN | 109527197 A | * | 3/2019 |
| JP | 2006020592 A | | 1/2006 |
| JP | 2006158265 A | | 6/2006 |
| JP | 2010029162 A | | 2/2010 |
| JP | 2011055831 A | | 3/2011 |
| JP | 2016049056 A | | 4/2016 |
| WO | 0013521 A1 | | 3/2000 |
| WO | 2011031020 A2 | | 3/2011 |

OTHER PUBLICATIONS

Liu, KeShun, Soybeans: Chemistry, Technology and Utilization, Springer p. 532, citation on p. 391 from Watanabe, et al., 1971 (Year: 1997).*

Cao et al. [Journal of Functional Foods, Probiotic Characteristics of Bacillus coagulans and associated implications for human health and diseases, 2019, citation of Özüsağlam & Aksaray, 2010, p. 2, par.3, Introduction]. (Year: 2019).*

Chinese Office Action for corresponding Chinese Application No. 202080034516.1dated Aug. 23, 2023, with English translation, 7 pages, with English translation of Chinese Office Action being submitted as English explanation of relevance for Wang Zhang et al. Food Chemistry.

Wang Zhang et al, «Food Chemistry», "Digestibility", China Light Industry Press, 1st Edition, untranslated, 7 pgs.

Extended European Search Report for European Application No. 20810024.8, mailed May 9, 2022, 7 pgs.

National Research Council (NRC), 1985, Nutrient Requirements of dogs, pp. 2, The National academis press, Washington, DC, 4 pages.

Ohshima, S., et al., "Evaluation of Nitrogen-Corrected Metabolizable Energy of Feedstuffs Commonly Used fo rDry Canine Diets," J. Pet Anim. Nutr., 3: 72-81, 5 pages.

PCT International Search Report (English Translation) dated Mar. 3, 2020 for Intl. App. No. PCT/JP2020/002741, from which the instant application is based, 5 pages.

* cited by examiner

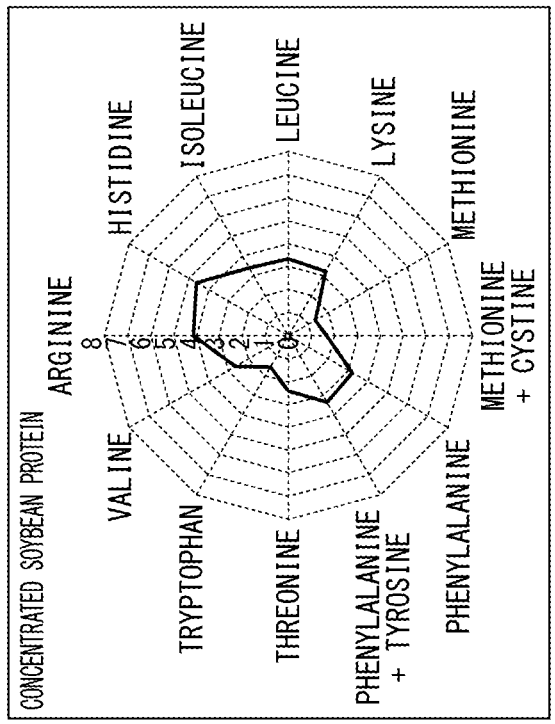
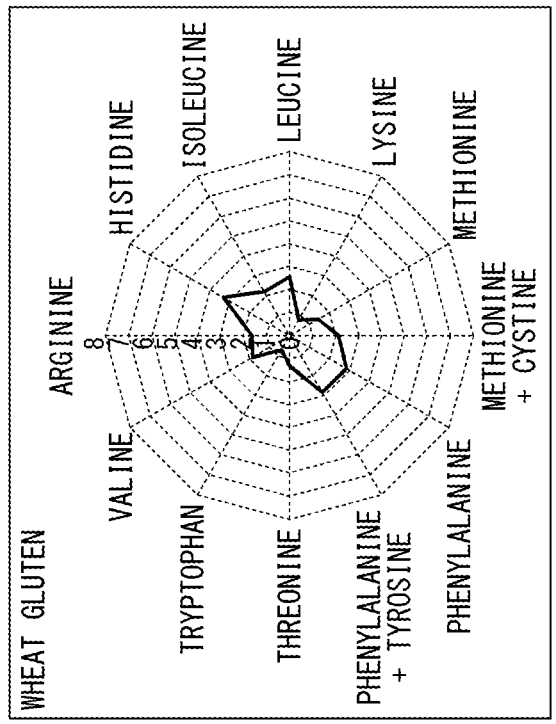
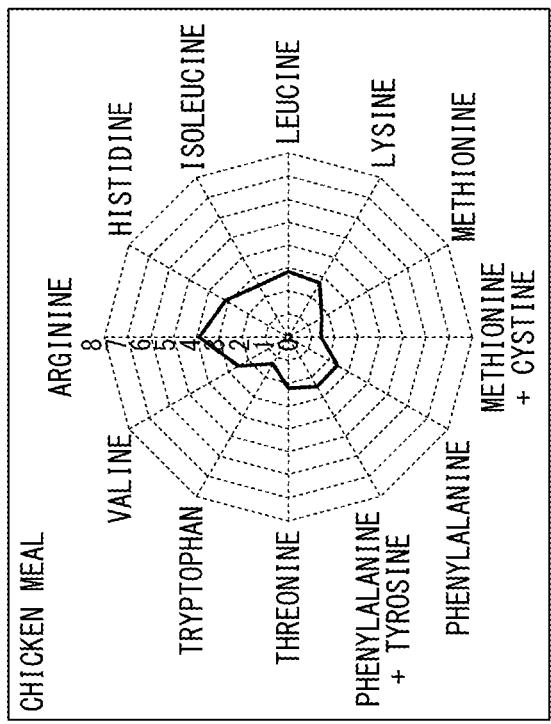
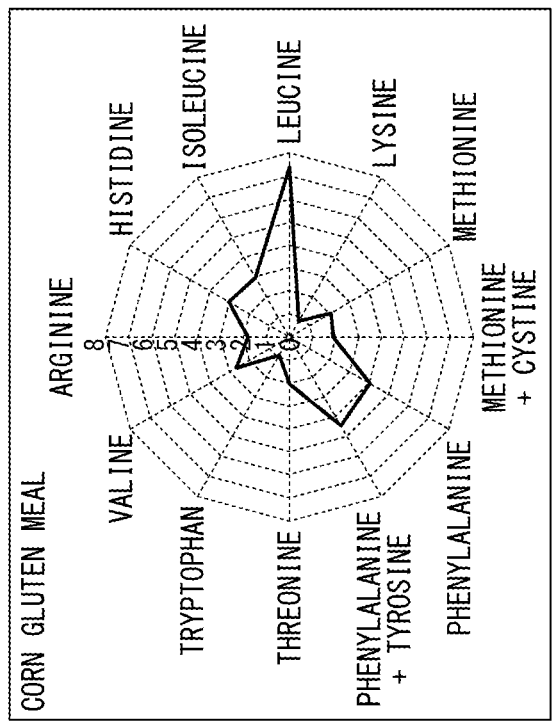

PET FOOD

RELATED APPLICATIONS

This application is a 35 U.S.C. 371 national phase filing from International Application No. PCT/JP2020/002741, filed Jan. 27, 2020, which claims priority to Japanese Application No. 2019-093764, filed May 17, 2019, the contents of which are incorporated herein by reference.

FIELD

The present invention relates to a pet food.

This application claims priority based on Japanese Patent Application No. 2019-093764 filed in Japan on May 17, 2019, the content of which is incorporated herein by reference.

BACKGROUND

It is assumed that a protein digestibility of conventional comprehensive nutritional diet pet foods (hereinafter, may be simply referred to as "pet foods") is about 80% (refer to, for example, Non-Patent Literature 1), and a protein digestibility of existing pet foods is predominantly in the order of 80%.

In addition to animal-based proteins, plant-based proteins are known to be used in combination to adjust amino acid balance of pet foods. As plant-based protein used in pet foods, defatted soybeans, corn gluten meal, and the like, which are inexpensive, are mainly used. For example, defatted soybeans are utilized as a lysine source (refer to, for example, Non-Patent Literature 2).

CITATION LIST

Non-Patent Literature

Non-Patent Literature 1: National Research Council (NRC). 1985. Nutrient requirements of dogs. pp. 2. The national academies press. Washington, DC Non-Patent Literature 2: Ohshima, S., Y. Fukuma, T. Suzuki and M. Abe. 2000. Evaluation of Nitrogen-corrected metabolizable energy of feedstuffs commonly used for dry canine diets. J. Pet Anim. Nutr., 3: 72-81.

SUMMARY

Technical Problem

However, when a plant basic ingredient is used for a pet food, digestion of proteins is inhibited due to protease inhibitors naturally contained in the plant, which makes it difficult to sufficiently increase a protein digestibility of the pet food.

The present invention was achieved in light of the above-described circumstances, and an object of the present invention is to provide a pet food in which a protein digestibility is improved while containing a basic ingredient as a plant-based protein source.

Solution to Problem

The present invention includes the following aspects.

(1) A pet food comprising: a soybean protein isolate, a fermented soybean meal, or a mixture thereof, wherein a protein digestibility is 88% or more.

(2) The pet food according to (1), wherein a content of β-conglycinin is 5 mass % to 10 mass % in terms of dry matter.

(3) The pet food according to (1) or (2), wherein a content of the soybean protein isolate is 10 mass % or more in terms of dry matter.

(4) The pet food according to any one of (1) to (3), wherein a content of β-conglycinin is 7.0 mass % to 10 mass % in terms of dry matter.

(5) The pet food according to any one of (1) to (4), wherein a content of a plant-based protein other than a plant-based protein derived from the soybean protein isolate and the fermented soybean meal is 11.0 mass % or less in terms of dry matter.

(6) The pet food according to any one of (1) to (5), wherein a total of a content of an animal-derived protein and a content of a soybean-derived protein derived from the soybean protein isolate and the fermented soybean meal is 20 mass % to 40 mass % in terms of dry matter.

Advantageous Effect of the Invention

According to the present invention, a pet food, in which a protein digestibility is improved while containing a basic ingredient as a plant-based protein source, can be provided.

BRIEF DESCRIPTION OF DRAWINGS

FIG. 1 shows graphs showing amino acid balance. (a) of FIG. 1 shows amino acid balance of chicken meal, (b) of FIG. 1 shows amino acid balance of concentrated soybean protein, (c) of FIG. 1 shows amino acid balance of corn gluten meal, and (d) of FIG. 1 shows amino acid balance of wheat gluten.

DESCRIPTION OF EMBODIMENTS

In the present specification, the term "pet" refers to an animal raised by a person. In a narrower sense, pets are animals that are kept and loved by their owners. In addition, the term "pet food" refers to feed for pets. A pet food according to the present invention can be sold as an "animal feed" or "animal food". The pet food of the present invention is eaten by various animals, but is preferred by cats and dogs, particularly dogs. Pet foods can be classified into a comprehensive nutritional diet fed as a normal diet, an in-between meal snack fed as a snack, a therapeutic diet containing a specific component used for a pet having a disease, and other purpose diets, but it is appropriate that the pet food of the present invention is a comprehensive nutritional diet.

<Pet Food>

A pet food according to the present embodiment contains a soybean protein isolate, a fermented soybean meal, or a mixture thereof, in which a protein digestibility is 88% or more.

Furthermore, in the pet food according to the present embodiment, a content of β-conglycinin is preferably 5 mass % to 10 mass % in terms of dry matter.

The soybean protein isolate is obtained as follows: acid is added to soybean milk, which is obtained after defatting soybeans and extraction with water, to obtain whey and curd; and the curd portion is fractionated by centrifugal separation or a filter, neutralized, dried, and ground. The soybean protein isolate has a high protein content as compared to concentrated soybean protein. In the soybean protein isolate, 99.9% is a protein component, and a protease inhibitor that is a digestion inhibitor factor of the protein is not contained. The soybean protein isolate is indicated as "soybean protein" on a basic ingredient label of a product, which is different from the name of other soybean products on a basic ingredient label.

The fermented soybean meal is obtained by fermenting dehulled soybean oil meal with lactic acid, drying, and grinding. In the fermented soybean meal, protein is degraded in advance by fermentation, and therefore a content of a protease inhibitor that is a digestion inhibitor factor of the protein is extremely small.

Since the soybean protein isolate does not contain a protease inhibitor, digestion of the protein is promoted. Furthermore, since the fermented soybean meal contains an extremely small amount of a protease inhibitor, digestion of the protein is promoted. Therefore, a protein digestibility is improved in the pet food according to the present embodiment containing the soybean protein isolate, the fermented soybean meal, or a mixture thereof.

Among them, the soybean protein isolate is preferable from the viewpoint of improving a protein digestibility.

In the present embodiment, a lower limit value of a content of the soybean protein isolate is preferably 10 mass % or more in terms of dry matter. Furthermore, a lower limit value of a content of the soybean protein isolate is more preferably 12 mass % or more in terms of dry matter. An upper limit value of a content of the soybean protein isolate is preferably 30 mass % in terms of dry matter. According to the above-described composition, amino acid balance can be adjusted. Examples of basic ingredients as an animal-derived protein source (basic ingredients as an animal-based protein source) include chicken meal, pork meal, meat meal, and the like. However, it is difficult to adjust minerals because non-edible portions (bones, viscera, and the like containing a large amount of minerals) are heat-treated, defatted, and then dried and powdered. In contrast, soybean protein has amino acid balance similar to that of animal-derived protein, but has a smaller mineral content and an almost no content of oils and fats than a basic ingredient as an animal-based protein source, which makes it easier to design nutrients.

FIG. 1 shows graphs showing amino acid balance. (a) of FIG. 1 shows amino acid balance of concentrated soybean protein, (b) of FIG. 1 shows amino acid balance of chicken meal, (c) of FIG. 1 shows amino acid balance of corn gluten meal, and (d) of FIG. 1 shows amino acid balance of wheat gluten. As shown in FIG. 1, the corn gluten meal and the wheat gluten have low scores for lysine and tryptophan which are essential amino acids, whereas the concentrated soybean protein contains a large amount of lysine and tryptophan and has amino acid balance similar to that of chicken meal. That is, it can be said that the soybean protein is closer to animal-based proteins than plant-based proteins.

β-Conglycinin is one of three proteins constituting the soybean protein. The soybean protein consists of three constituents: glycinin, β-conglycinin, and LP (protein associated with lipid). A content of the soybean protein can be calculated by a content of β-conglycinin.

For example, when a soybean protein isolate with about 100% (99.9%) of soybean protein is analyzed, it became clear that about 40% of β-conglycinin is contained. It is reported in Function and Science of Soybeans. 2012. pp. 31 (authors: Tomotada ONO, Makoto SHIMOYAMADA, and Koji MURAMOTO) that in a soybean protein isolate, a content of 7S protein (β-conglycinin+γ-conglycinin+basic 7S globulin) is 41%, a content of 2S protein (α-conglycinin) is 16%, a content of 11S protein (glycinin) is 31%, and a content of 15S protein is 3%. Furthermore, by analysis by electrophoresis, it was found that a content of β-conglycinin was 27.8% with respect to a total mass of the soybean protein isolate.

In the pet food according to the present embodiment, a protein digestibility is 88% or more, a protein digestibility is preferably 90% or more, and a protein digestibility is more preferably 92% or more. An upper limit value of the protein digestibility is not particularly limited, but it is preferably 99% or less from the viewpoint of practical use.

In conventional comprehensive nutritional diet pet foods, a standard digestibility specified by the Association of American Feed Control Officials (AAFCO) is 80% or more. Furthermore, in a therapeutic diet specialized in improvement of digestibility, a content of highly digestible animal proteins is increased, and a content of indigestible components such as dietary fiber is reduced, but a digestibility is often set to about 87% as a target value.

In contrast, in the pet food according to the present embodiment, a protein digestibility is 88% or more, which is very high, while containing a basic ingredient as a plant-based protein source. Therefore, the pet food according to the present embodiment is easy for pets to eat, which makes it possible for a user to feed a pet with a sense of security. The pet food according to the present embodiment is useful particularly for pets having a poor digestion ability such as older dogs or small dogs.

Furthermore, when a protein digestibility of a pet food high, this is expected to prevent generation of food allergy.

In the pet food according to the present embodiment, a content of β-conglycinin is preferably 5 mass % to 10 mass % in terms of dry matter, is more preferably 7.0 mass % to 10 mass % in terms of dry matter, and is even more preferably 8.0 mass % to 10.0 mass % in terms of dry matter. When a content of β-conglycinin is equal to or more than the lower limit value within the above range, a protein digestibility is easily improved.

In the pet food according to the present embodiment, a content of a plant-based protein other than a plant-based protein derived from the soybean protein isolate and the fermented soybean meal is preferably 11.0 mass % or less in terms of dry matter, and is more preferably 10.0 mass % or less in terms of dry matter.

In the pet food according to the present embodiment, a content of a protein derived from corn gluten meal is preferably 2.0 mass % or less in terms of dry matter.

According to the above-described composition, a high content of protease inhibitors, which are contained a plant-based protein other than a plant-based protein derived from the soybean protein isolate and the fermented soybean meal, can be reduced, which makes it easy to further improve a protein digestibility.

A total of a content of an animal-derived protein and a content of a soybean-derived protein derived from the soybean protein isolate and the fermented soybean meal is preferably 20 mass % to 40 mass % in terms of dry matter, and is more preferably 20 mass % to 30 mass % in terms of dry matter. This composition makes it easy to further improve a protein digestibility.

The pet food according to the present embodiment is not limited to a dry type in which a moisture content is 10% by weight or less, and can also be applied to a pet food of a soft type in which a moisture content is about 15% to 35% by weight or a wet type in which a moisture content is about 80% by weight.

In the pet food according to the present embodiment, a formulation of basic ingredients is not particularly limited as long as the pet food is a comprehensive nutritional diet that satisfies criteria of nutritional foods. As the pet food, it is preferable to set a formulation of basic ingredients so that a nutritional composition of food particles is satisfied and favorable moldability is obtained.

The pet food according to the present embodiment can be more preferably used as a pet food for dogs.

[Basic Ingredient]

In the pet food according to the present embodiment, basic ingredients are not limited as long as the above-described composition is satisfied. Well-known basic ingredients can be used in manufacturing of the pet food.

Examples of powder basic ingredients include grains (corn, wheat, rice, barley, oat, rye, and the like), beans (defatted soybeans, whole soybeans, and the like), starches (wheat starch, corn starch, rice starch, potato starch, tapioca starch, sweet potato starch, sago starch, and the like), basic ingredients as a plant-based protein source (corn gluten meal, wheat gluten, and the like), meat (chicken, beef, pork, venison, meals (chicken meal, pork meal, beef meal, mixed meal thereof), and the like), fish and shellfish (fish meat, meals (fish meal), and the like), vegetables, and powdery additives (vitamins, minerals, amino acids, flavor basic ingredients, fibers, colorants, palatants, and the like).

Meals means powders obtained by compressing and finely crushing meat or fish and shellfish. Examples of palatants include animal-based extract, plant-based extract, yeast extract (beer yeast extract, baker's yeast extract, torula yeast extract), dry products of yeast (beer yeast, baker's yeast, torula yeast, and the like), and the like.

A formulation of basic ingredients is not particularly limited. It is preferable to set the formulation so that a nutritional composition of food particles to be obtained is satisfied and favorable moldability is obtained.

Examples of formulations include a total of 100 mass % containing 40 to 75 mass % of grains, 10 to 25 mass % of meat, 5 to 15 mass % of fish and shellfish, 2 to 5 mass % of vitamins and minerals, 2 to 20 mass % of oils and fats, and other components for the residual content.

As a liquid basic ingredient added to the powder basic ingredient, a liquid basic ingredient such as water, oils and fats, liquid sugar, palatant solutions, fragrances, and coloring agents can be used as necessary. Furthermore, after drying swollen particles, the particles may be coated with a liquid basic ingredient (coating agent) including oils and fats, seasoning agents, palatants, fragrances, or the like.

The oils and fats may be plant-based oils and fats, or may be animal-based oils and fats (chicken oil, pork fat (lard), beef tallow (het), milk fat, and the like). The coating agent preferably contains animal-based oils and fats, and particularly preferably contains beef tallow.

[Shape and Size]

The shape of food particles constituting the pet food according to the present embodiment is not particularly limited as long as it is a shape suitable for pets to eat. For example, any shape such as a spherical shape, a polygonal body shape, a columnar shape, a doughnut shape, a plate shape, a grid shape, and a clover shape is applicable. Furthermore, regarding the size of the food particles, the food particles may be in a small particle form that a pet can chew with a bite, or may be in a large particle form that a pet can bite multiple times.

Regarding the size of the food particles, for example, a shortest diameter and a longest diameter are preferably 3 to 30 mm, respectively, are more preferably 6 to 16.5 mm, respectively, and are even more preferably 7 to 13 mm, respectively.

<Method for Manufacturing Pet Food>

As a method for manufacturing the pet food according to the present embodiment, a well-known method can be used, and there is no particular limitation as long as the composition of the above-described present embodiment is satisfied. As a well-known method, there is a method for manufacturing the pet food in the following order: a granulating step, a drying step, and a coating step.

[Granulating Step]

A granulating step is a step of granulating a basic ingredient mixture to obtain particles. Examples of granulating steps include a method in which basic ingredients are mixed to form a basic ingredient mixture, and the basic ingredient mixture is molded (granulated) into a particle shape.

Specific examples of granulating steps include a method for manufacturing particles (swollen particles) using an extruder.

As the method for manufacturing particles using an extruder, for example, a method disclosed in "Small Animal Clinical Nutrition, 5th Edition" can be applied (edited by Michael S. Hand, Craig D. Thatcher, Rebecca L. Remillard, Philip Roudebusg, and Bruce J. Novotny; published by Mark Morris Associates; 2014; p. 209 to p. 215).

[Drying Step]

The drying step is a step of drying the particles obtained by the above-described granulating step. Examples of methods of drying particles include known methods such as a method of drying naturally, a method of drying by blowing warm air, a method of drying by decompressing, and a method of drying by freeze-drying. Among these drying methods, the method of drying by blowing warm air is preferable from the viewpoint of improving a digestibility of the pet food.

[Coating Step]

The coating step is a step of coating the food particles obtained in the drying step with a coating agent including coarse beef tallow, seasoning agents, fragrances, or the like.

A method of coating the food particles is not particularly limited. For example, a vacuum coating method can be used. The vacuum coating method is a method of decompressing in a state where warmed particles are brought into contact with or adhered to oils and fats or the like. The coating agent may be in a liquid state or in a powder state. The coating makes it possible to improve palatability (foraging behavior of pets) for pets.

EXAMPLES (Manufacturing of Pet Food)

Basic ingredients constituting a comprehensive nutritional diet pet food were mixed in a formulation shown in Table 1. The obtained mixture of basic ingredients was put into an extruder and subjected to a heat treatment at 100° C. to 140° C. for 1 to 5 minutes while kneading to gelatinize a starch component, and then extruded and granulated into a grain shape at an outlet of the extruder and swelled at the same time. The obtained grains were subjected to a drying treatment at 125° C. for 15 minutes using a dryer, and thereby a pet food of each example was obtained.

TABLE 1

|  | Comparative Example 1 (mass %) | Example 1 (mass %) | Example 2 (mass %) |
|---|---|---|---|
| Basic ingredient as animal-based protein source | 16.5 | 17.5 | 17.3 |
| Soybean protein isolate | — | 10.0 | — |
| Fermented soybean meal | — | — | 19.8 |
| Basic ingredient as plant-based protein source (corn gluten meal/defatted soybeans) | 11.4 | — | — |
| Grains | 61.5 | 57.1 | 49.7 |
| Celluloses | — | 3.0 | 1.0 |
| Beet pulp | 2.1 | 2.0 | 2.0 |
| Animal-based oils and fats | 7.4 | 7.0 | 6.9 |
| Vitamins and minerals | 1.1 | 2.4 | 2.3 |
| Other components | — | 1.0 | 1.0 |

A "basic ingredient as a plant-based protein source" used in Comparative Example 1 was corn gluten meal and defatted soybean, and the pet food of Comparative Example 1 did not contain soybean protein isolate and fermented soybean meal.

"Other components" in Table 1 were ingredients derived from a palatant such as an animal-based extract, a plant-based extract, or a yeast extract.

Table 2 shows amounts of β-conglycinin contained in the pet foods of Example 1 and Comparative Example 1 in terms of dry matter.

TABLE 2

|  | Comparative Example 1 | Example 1 |
|---|---|---|
| β-Conglycinin | 1.9 mass % | 5.04 mass % |

(Evaluation of Protein Digestibility of Pet Food)

Seven beagles were divided into 3 groups (n=2×2 groups, n=3 days×1 group) before the start of a test. The first cycle was 11 days with five days as an acclimation period for familiarizing the pet foods with the body environment, and six days thereafter as a test period. Each of the three kinds of the pet foods of Comparative Example 1 and Examples 1 to 2 was fed to each of the groups in the first cycle, and three cycles were performed. Stool collection and stool form scoring were performed daily during the test period. Measurement of feed intake was performed during both of the acclimation period and test period.

Table 3 shows a constitution of animal groups used in the test. Ages and body weights were measured 2 weeks before the start of the test. Furthermore, Table 4 shows analysis results of general components of the fed pet foods.

TABLE 3

| Group | No. | Sex | Age | Body weight (kg) | Breed |
|---|---|---|---|---|---|
| (1) | 1 | F | 5 | 12.8 | Beagle |
|  | 2 | F | 5 | 12.7 | Beagle |
| (2) | 3 | F | 5 | 11.9 | Beagle |
|  | 4 | F | 5 | 12.4 | Beagle |
| (3) | 5 | F | 5 | 11.5 | Beagle |

TABLE 3-continued

| Group | No. | Sex | Age | Body weight (kg) | Breed |
|---|---|---|---|---|---|
|  | 6 | F | 5 | 12.5 | Beagle |
|  | 7 | F | 5 | 12.1 | Beagle |

The breeding environment was as the following content.
Temperature: 18° C. to 28° C.
Humidity: 30% to 80%
Ventilation frequency: 10 or more times/hour
Illumination: illumination with fluorescent lamp for 12 hours (7 to 19 hours)/day
Breeding form: 1 animal/cage
Cage used: made of stainless steel (W750×D850×H600 mm)
Cage cleaning: once/day (where water was not used during the stool collection period) Groundwater into which chlorine was added (chlorine concentration of 0.3 to 0.5 ppm) was used as drinking water, and was fed ad libitum from an automatic water feeder.

TABLE 4

|  | Comparative Example 1 | Example 1 | Example 2 |
|---|---|---|---|
| Moisture | 8% | 9% | 9% |
| Protein | 25% | 29% | 31% |
| Lipid | 13% | 13% | 13% |
| Crude fiber | 2% | 3% | 2% |
| Ash content | 6% | 4% | 5% |
| Calorie (kcal/100 g) | 357 | 359 | 360 |
| GE (kcal/100 g) | 452 | 461 | 464 |

* Gross Energy (GE): total energy

Measurement of body weights was performed on the starting day (day 1) for the first cycle shown in Table 5 and on the day before the start (day 11 and day 22) for the second cycle and the third cycle. An amount calculated for each individual was fed once a day at 10:00 to 11:00. An amount of the residual feed (including an amount spilled) was measured at the time of feeding on the next day, and feed intake was calculated by subtracting the amount of the residual feed from a feeding amount on the previous day.

The feeding amount was calculated for each individual by the following calculation formula. Daily energy requirement (DER), which is a numerator of the following calculation formula, was obtained by multiplying maintenance phase energy requirement (MER) by a body weight$^{0.75}$ (kg). MER was set at "110 (kcal ME/kg$^{0.75}$)". This value is presented as an MER value for 3- to 7-year-old dogs in FEDIAF Nutritional Guidelines 2017 (Table VII-6. (p. 62), Table VII-7. (p. 63)). Measurement of body weights was performed a total of four times (day 1, day 11, day 22, and day 33) (instrument used: GP-100K of A&D Company, Limited).

Feeding amount=DER/Metabolizable energy of food (Kcal/g)   [Equation 1]

Stool collection was performed on day 6 (10:00) to day 11 (10:00), day 17 (10:00) to day 22 (10:00), and day 28 (10:00) to day 33 (10:00). A total amount of stools was collected for 120 consecutive hours for each period.

Stools were collected in a plastic bag attached with a zipper. At the time of collection, hair was prevented from being mixed as much as possible. The collected stools were immediately frozen and stored frozen at −20° C. or lower. After the stool collection for 120 consecutive hours, stools were put together into one bag for each individual for each cycle. After the test period was completed and all samples were obtained, analysis of general components was performed, metabolizable energy (ME) was calculated from the analytical values of the test food and stools, and thereby a digestibility was obtained.

TABLE 5

| Group | No. | First cycle (days 1 to 5: acclimation period) (days 6 to 11: test period) | Second cycle (days 12 to 16: acclimation period) (days 17 to 22: test period) | Third cycle (days 23 to 27: acclimation period) (days 28 to 33: test period) |
|---|---|---|---|---|
| (1) | 1 | Comparative Example 1 | Example 2 | Example 1 |
|  | 2 |  |  |  |
| (2) | 3 | Example 2 | Example 1 | Comparative Example 1 |
|  | 4 |  |  |  |
| (3) | 5 | Example 1 | Comparative Example 1 | Example 2 |
|  | 6 |  |  |  |
|  | 7 |  |  |  |

4.4 kcal was used for a coefficient of crude protein (CP), where 4.4 kcal was obtained by subtracting a coefficient (=1.25 kcal) for obtaining a nitrogen component of urine from a coefficient (=5.65 kcal) for obtaining gross energy (GE). 9.4 kcal was used for a coefficient of crude fat. 4.1 kcal was used for a coefficient of NFE. ME (kcal/100 g) in each individual was calculated by the following calculation formula.

$$ME = \{(A-a) \times 4.4 + (B-b) \times 9.4 + (C-c) \times 4.1\}/F \times 100$$

A=crude protein (CP) of component amount (g) in intake food
a=crude protein (CP) of component amount (g) in collected stools
B=crude fat of component amount (g) in intake food
b=crude fat of component amount (g) in collected stools
C=NFE of component amount (g) in intake food
c=NFE of component amount (g) in collected stools
F=feed intake (g) during the test period Table 6 shows results of calculating a digestibility, in terms of energy, by the following formula using the calculated ME in each individual. For GE of the fed food, values calculated in Table 4 were used.

Energy digestibility (%) = ME in each individual/GE of fed food × 100

TABLE 6

|  | Comparative Example 1 | Example 1 | Example 2 |
|---|---|---|---|
| Protein | 86.6 ± 0.6% | 91.6 ± 1.2% | 88.8 ± 1.4% |
| Lipid | 95.8 ± 0.3% | 97.0 ± 0.6% | 97.2 ± 0.4% |
| NFE | 85.6 ± 1.7% | 92.2 ± 1.2% | 90.3 ± 1.7% |
| Dry matter | 83.2 ± 1.0% | 88.2 ± 1.4% | 87.0 ± 1.3% |
| Energy | 82.2 ± 0.7% | 85.5 ± 0.8% | 83.7 ± 0.9% |

A protein digestibility of the pet food of Comparative Example 1 was high (80% or more) as compared with the standard digestibility specified by the Association of American Feed Control Officials (AAFCO), but in the pet foods of Examples 1 and 2, a protein digestibility further increased. A protein digestibility of the pet food of Example 1 was 90% or more.

According to the present invention, a pet food, in which a protein digestibility is improved while containing a basic ingredient as a plant-based protein source, can be provided.

Although preferable examples of the present invention have been described above, the present invention is not limited to these examples. Within a range not departing from the spirit of the present invention, configurations can be added, omitted, and replaced, and other modifications can be made.

INDUSTRIAL APPLICABILITY

According to the present invention, a pet food, in which a protein digestibility is improved while containing a basic ingredient as a plant-based protein source, can be provided.

The invention claimed is:

1. A pet food comprising:
   a soybean protein isolate, a fermented soybean meal, or a mixture thereof, wherein
   a content of β-conglycinin is 5 mass % to 10 mass % in terms of dry matter,
   a content of a plant-based protein other than a plant-based protein derived from the soybean protein isolate and the fermented soybean meal is 11.0 mass % or less in terms of dry matter, and
   digestibility of a protein contained in the pet food is 88% or more.

2. The pet food according to claim 1, wherein a content of the soybean protein isolate is 10 mass % or more in terms of dry matter.

3. The pet food according to claim 1, wherein a content of β-conglycinin is 7.0 mass % to 10 mass % in terms of dry matter.

4. The pet food according to claim 1, wherein a total of a content of an animal-derived protein and a content of a soybean-derived protein derived from the soybean protein isolate and the fermented soybean meal is 20 mass % to 40 mass % in terms of dry matter.

* * * * *